United States Patent
Gebhardt et al.

(10) Patent No.: US 8,020,773 B2
(45) Date of Patent: Sep. 20, 2011

(54) METHOD FOR PERSONALIZING CHIP CARDS

(75) Inventors: Wolfgang Gebhardt, Neustadt/Aisch (DE); Arne Lehmeyer, Ansbach (DE); Guido Treutwein, Fürth (DE); Rainer Wörz, Zirndorf (DE)

(73) Assignee: Siemens It Solutions and Services GmbH, Munich (DE)

( * ) Notice: Subject to any disclaimer, the term of this patent is extended or adjusted under 35 U.S.C. 154(b) by 1132 days.

(21) Appl. No.: 11/791,637

(22) PCT Filed: Nov. 11, 2005

(86) PCT No.: PCT/EP2005/055911
§ 371 (c)(1),
(2), (4) Date: May 25, 2007

(87) PCT Pub. No.: WO2006/058828
PCT Pub. Date: Jun. 8, 2006

(65) Prior Publication Data
US 2008/0116261 A1 May 22, 2008

(30) Foreign Application Priority Data
Dec. 1, 2004 (DE) .......................... 10 2004 058 020

(51) Int. Cl.
*G06K 19/06* (2006.01)
(52) U.S. Cl. .................................................... 235/492
(58) Field of Classification Search .................. 235/380, 235/492
See application file for complete search history.

(56) References Cited

U.S. PATENT DOCUMENTS

| | | | |
|---|---|---|---|
| 6,202,155 B1* | 3/2001 | Tushie et al. | 726/20 |
| 6,335,799 B1* | 1/2002 | Provost | 358/1.4 |
| 6,484,935 B1* | 11/2002 | Fischbacher | 235/376 |
| 6,902,107 B2* | 6/2005 | Shay et al. | 235/381 |
| 2001/0007333 A1* | 7/2001 | Goman et al. | 235/380 |
| 2003/0050899 A1* | 3/2003 | Tushie et al. | 705/65 |
| 2005/0236473 A1* | 10/2005 | Lenz et al. | 235/380 |
| 2007/0136594 A1* | 6/2007 | Jordan et al. | 713/172 |

FOREIGN PATENT DOCUMENTS

| | | |
|---|---|---|
| DE | 39 27 270 A1 | 2/1991 |
| DE | 196 33 466 A1 | 2/1998 |
| DE | 199 22 946 A1 | 11/2000 |
| DE | 199 47 986 A1 | 4/2001 |

(Continued)

OTHER PUBLICATIONS

International Search Report for Application No. PCT/EP2005/055911; mailed Jun. 14, 2006.

*Primary Examiner* — Ahshik Kim
(74) *Attorney, Agent, or Firm* — Staas & Halsey LLP

(57) ABSTRACT

Key information is stored in a memory of a chip card for the purposes of partial personalization. For a complete personalization, an instruction sequence definition and an instruction sequence designed for a chip card application and including instructions to be carried out by the chip card are transmitted to the chip card. A check which is secured by the key information is carried out for each chip card instruction to determine whether the chip card instruction satisfies the instruction sequence definition, and if it does, the chip card instruction is carried out by the chip card.

10 Claims, 5 Drawing Sheets

FOREIGN PATENT DOCUMENTS

| | | |
|---|---|---|
| DE | 199 58 599 A1 | 6/2001 |
| DE | 100 65 749 A1 | 7/2002 |
| DE | 101 23 664 A1 | 11/2002 |
| DE | 102 12 875 A1 | 10/2003 |
| DE | 102 18 795 A1 | 11/2003 |
| DE | 102 30 447 A1 | 1/2004 |
| WO | 99/08466 | 2/1999 |

* cited by examiner

METHOD FOR PERSONALIZING CHIP CARDS

CROSS REFERENCE TO RELATED APPLICATIONS

This application is based on and hereby claims priority to German Application No. 10 2004 058 020.0 filed on Jan. 12, 2004, the contents of which are hereby incorporated by reference.

BACKGROUND

Chip card personalization whereby data individual to the card and/or person is transferred to the relevant chip card has hitherto been carried out mainly in secure personalization centers on the premises of a chip card manufacturer, certification agency or trusted service provider.

In such a personalization center, personalization data predefinable on a customer-specific basis, e.g. a user name, account number or other customer-specific data or applications, is transferred to the chip card. The personalization centers are usually protected against tampering by the use of electronic, mechanical security mechanisms and/or organizational measures, as security-relevant data (e.g. the chip card user's personal data, PINs, etc.) is processed there, and disclosure of information to unauthorized persons and influencing of the personalization process by unauthorized persons must be prevented.

If, for example, in the case of chip cards used for personal identification, maximum security is required, in particular to prevent tampering with or falsification of the data stored on the chip card, personalization has hitherto mainly been carried out in secure personalization centers.

Personalization in a non-secure environment outside personalization centers has hitherto only been carried out for chip cards with low security requirements.

Personalizing a chip card usually includes activating one or more applications on the chip card together with generating security keys and/or security key pairs, e.g. so-called symmetric keys or RSA keys (RSA: encryption algorithm named after the inventors Rivest, Shamir and Adleman). Generating security key pairs has proved very time consuming compared to the remaining personalization steps. The number of chip cards processed in any given period in a personalization center is significantly affected by the time required for generating the security keys of the relevant chip cards.

Personalization of a chip card often cannot be completed in a single personalization session, as at the time of issue of the chip card it is not yet fully known which applications are to be transferred to the chip card and installed on the chip card. Moreover, in the case of multi-application chip cards which may contain a plurality of applications, it is necessary to activate applications over the lifetime of the chip card. According to the related art, the chip card must be returned to the secure personalization center for this purpose, if the relevant security specifications so require.

SUMMARY

An aspect is to provide a flexible method for personalizing chip cards.

With the method described below, to personalize a chip card as part of a partial personalization preferably to be carried out in a secure personalization center, key information, e.g. a unique secure messaging key and/or an authentication key, is stored in a preferably nonvolatile memory of the chip card. Such a nonvolatile memory can be implemented e.g. as an EEPROM on the chip card. As part of a supplemental personalization which can performed even in a non-secure environment, an instruction sequence definition and an instruction sequence creating a chip card application and containing chip card instructions to be executed by the chip card are transferred to the chip card. In addition for a particular chip card instruction of this instruction sequence a check which uses key information and is therefore secure is performed to ascertain whether this chip card instruction satisfies the instruction sequence definition. If so, the chip card instruction is executed by the chip card.

It should be noted that the stated sequence of the method features need not correspond to the chronological order of these features. For example, the checking of the chip card instructions can be carried out contiguously with the start of supplemental personalization, before the relevant chip card instructions are executed.

The validity of the instruction sequence can preferably be ensured using the key information when the instruction sequence is transferred to the chip card or when the instruction sequence is installed on the chip card. The checking of the instruction sequence using the instruction sequence definition can then take place when the instruction sequence is processed, without additional safeguarding by use of the key information.

One advantage of checking the instruction sequence by using an instruction sequence definition is that it ensures that only untampered-with instruction sequences from a trustworthy source can be executed, as only these satisfy the instruction sequence definition.

Supplemental personalizations can be safely carried out in non-secure areas such as the user's home, local sales offices for mobile phone cards, chip card coding stations for employee cards, bank branch offices for credit or debit cards or registration offices for IDs and identification chip cards, the personalizations hitherto being carried out only in secure personalization centers in order to meet stringent security requirements.

Time-consuming personalization steps, in particular generating certificates and key pairs, can be carried out as part of the supplemental personalization, it being advantageous that these time-consuming steps need not be performed in a personalization center, thereby achieving a shorter personalization time per chip card there and enabling the personalization center to partially personalize chip cards at a quicker rate.

It is also advantageous that multi-application chip cards for which further applications may be transferred even after they have been issued do not need to be returned to the personalization center for activation of the applications in order to complete personalization. Activation of such an application can be carried out as part of the supplemental personalization, i.e. supplemental personalization with applications can be carried out outside the personalization center, e.g. at home by the chip card user himself.

The checking of the chip card instructions can be implemented, for example, by using a secure messaging key as the key information, and therefore protected, so as to prevent the instruction sequence and/or the instruction sequence definition from being transferred to the chip card using an incorrect secure messaging key. In addition, the chip card can contain e.g. a private key of an RSA key pair as key information. The transferred instruction sequence and/or instruction sequence definition can be encrypted for security purposes by a public RSA key of the chip card. This means that the chip card, and it alone, can decrypt the instruction sequence and/or the instruction sequence definition using the private key stored on the chip card. In addition, an authentication or signature key can be used as key information in order to ensure that the instruction sequence and/or the instruction sequence definition is generated and communicated by the expected agency, preferably the personalization center performing partial personalization.

Prior to execution of the relevant chip card instruction of the instruction sequence a check is performed using the instruction sequence definition to ascertain whether the chip card instruction to be carried out satisfies the instruction sequence definition. In the event of a positive result, the chip card instruction is executed; in the event of a negative result, it is not executed.

According to a further development, an access authorization for executing the instruction sequence can be set on the chip card, and prior to execution of the relevant chip card instruction a check can be performed to ascertain whether the access authorization is present. In the event of a positive result, the relevant chip card instruction can then be executed. In the event of a negative result, execution of the relevant chip card instruction can be suppressed.

The access authorization can be advantageously set when the instruction sequence is invoked by the operating system. In another embodiment, an access authorization assigned to the chip card instruction can be set prior to execution of the relevant chip card instruction of the instruction sequence and deleted again after the instruction has been executed.

Such an access authorization for a chip card instruction can include, for example, a write permission to a particular memory area. Another example of an access authorization is an authorization of a chip card instruction to generate a key for encryption or a certificate for authentication.

The setting and deleting of an access authorization permits easy implementation of checking routines to check whether a chip card instruction may be executed. In addition, such checking routines provide a simple means of ensuring that when processing chip card instructions outside of supplemental personalization the chip card cannot execute any instruction that is only permitted during supplemental personalization, by checking the access authorizations each time a chip card instruction is executed during and outside of supplemental personalization.

According to a development, the key information can be individual to a chip card or chip card group. A chip card group can be assigned e.g. to a particular chip card production batch, a particular chip card sales client, a particular application, e.g. for use as a gas station card, or to all chip cards produced. For partial personalization there can therefore be a restriction as to the chip cards on which a particular instruction sequence can be executed—only on an individual chip card, on a chip card group or on all chip cards.

According to an advantageous embodiment, the instruction sequence definition can simulate states and state transitions of a state machine which changes from a particular state to a predefined next state that is different from previously assumed states, a particular state being assigned in each case a predefined chip card instruction which is permitted to be executed in that state.

The instruction sequence definition can include, for the preferably entire instruction sequence, information patterns with which it can be determined by comparison with chip card instructions contained in the instruction sequence whether a particular chip card instruction to be executed from the instruction sequence satisfies the instruction sequence definition, whether a sequence of chip card instructions is correct, and/or whether after processing of the instruction sequence all the chip card instructions contained in the instruction sequence have been processed and the instruction sequence has therefore been processed completely, it being possible for the instruction sequence definition to be implemented in such a way that it contains, for each chip card instruction of the associated instruction sequence, information identifying the chip card instruction, preferably in as concise a form as possible.

A state diagram of the state machine advantageously contains no branches, loops or recursions, thereby enabling the execution of the instruction sequence during supplemental personalization of the chip card to be restricted to those instruction sequences provided for that purpose by the personalization agency carrying out partial personalization. The absence of recursions makes it possible to ensure that, as it advances through the state diagram, an instruction sequence is executed unchanged, once, essentially completely and/or in the correct sequence. A chip card user is therefore protected from manipulation by unauthorized third parties.

In addition, the instruction sequence definition, the instruction sequence, a chip card application partially set up by processing the instruction sequence up to a particular chip card instruction, the access authorization, the state machine and/or an assumed state of the state machine can be stored in a preferably nonvolatile memory of the chip card. This means that an interrupted supplemental personalization can be continued again after the interruption. Using a nonvolatile memory for storing the specified information enables supplemental personalization to be continued even after an interruption to the power supply.

This further increases the protection against tampering, because a tampered-with, only partially valid instruction sequence and instruction sequence definition cannot be deleted by simple means such as interrupting the power supply, and then replaced by a modified, likewise tampered-with instruction sequence and instruction sequence definition.

Continuation of an interrupted supplemental personalization can preferably be carried out by continuing the instruction sequence from the last assumed state of the state machine. Alternatively an interrupted supplemental personalization can be continued in such a way that execution of the instruction sequence is resumed at its start and all the already processed chip card instructions are ignored until the chip card instructions not yet processed are queued for execution.

According to a development, after complete processing of the instruction sequence, information indicating completed supplemental personalization can be stored on the chip card, the access authorization can be deleted, and/or the instruction sequence definition, the instruction sequence, the state machine and/or a state of the state machine can be deleted from the chip card. The information indicating completed supplemental personalization can also be represented by information which is deleted after completed personalization, thereby indicating by its absence that personalization has been completed.

It is particularly advantageous that, after supplemental personalization, data and chip card instructions no longer required can be deleted, thereby freeing up memory. In addition, the presence or absence of data on the chip card can be evaluated by the chip card's operating system to detect whether the chip card is in the supplemental personalization state, whether supplemental personalization has already been completed, or whether supplemental personalization has not yet been initiated. Depending on this evaluation the chip card's operating system can decide whether the instructions to be carried out must be executed with different access authorizations.

According to a development, a chip card instruction of an instruction sequence, preferably the last chip card instruction of the instruction sequence, can contain an instruction sequence definition for another instruction sequence. This enables instruction sequences to be executed in a cascaded manner and long instruction sequences to be subdivided into a plurality of short, modular instruction sequences and executed successively.

In addition, after execution of the last chip card instruction of the instruction sequence a test routine for checking successful supplemental personalization can be invoked and, if defective supplemental personalization is detected, the test routine can store information indicating defective personalization on the chip card. This means that a chip card program can ascertain, simply by reading out this information, whether an application has been personalized in an error-free manner and only access the application if that is the case. This test routine can be permanently stored on the chip card, be part of the instruction sequence or, like the instruction sequence, be transferred to the chip card as part of supplemental personalization and deleted again after completion.

According to a development, as part of partial personalization a routine can be executed which reserves a memory area or a directory on the chip card for accommodating data generated as part of supplemental personalization when the instruction sequence is executed. It is thereby possible to guarantee that during the processing of supplemental personalization no lack of memory or memory overflow occurs and that only the instruction sequences whose chip card instructions write to this previously reserved memory area can be completely executed.

According to a development, up until complete processing of the instruction sequence, calling of chip card instructions not contained in the instruction sequence can be inhibited. This means that a chip card cannot be used for its intended purpose until supplemental personalization has been completely executed and terminated.

BRIEF DESCRIPTION OF THE DRAWINGS

These and other objects and advantages will become more apparent and more readily appreciated from the following description of an exemplary embodiment, taken in conjunction with the accompanying drawings in which.

DETAILED DESCRIPTION OF THE PREFERRED EMBODIMENT

Figure 1:
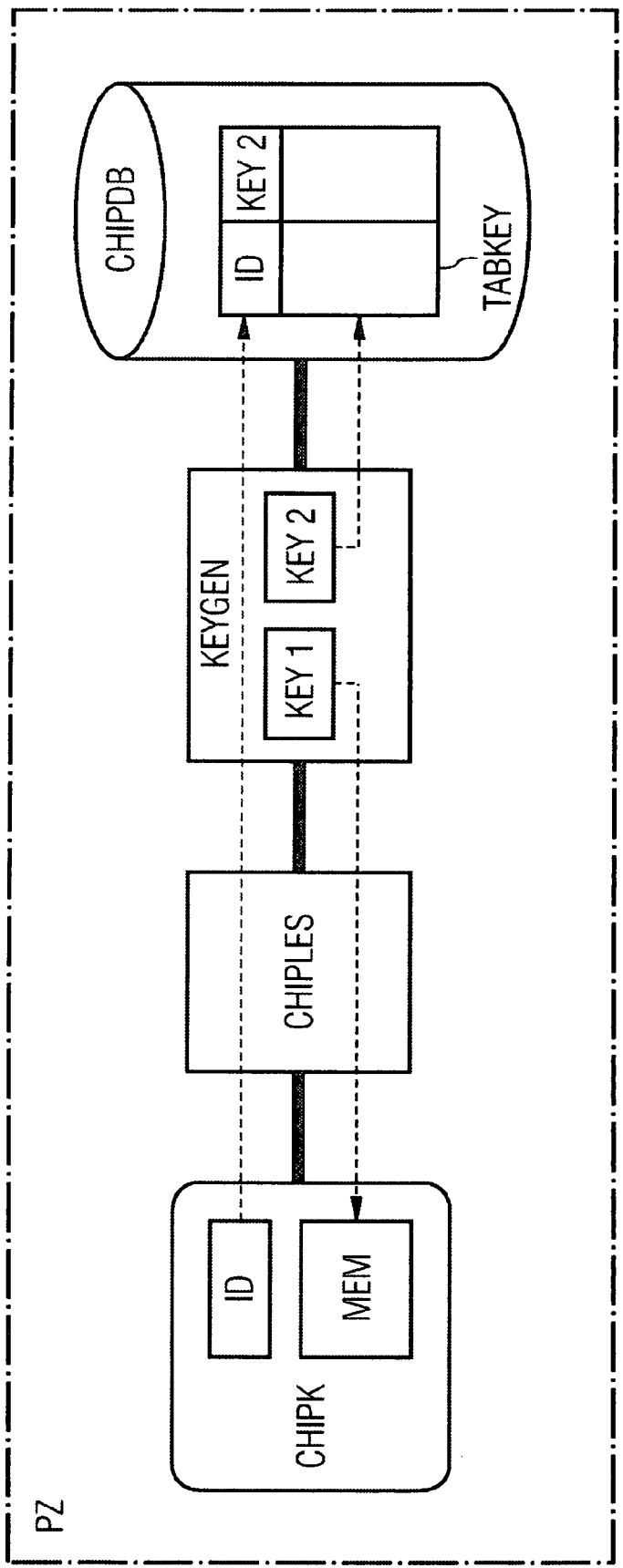
FIG. 1 is a block diagram of a partial chip card personalization taking place in a personalization center.

Reference will now be made in detail to the preferred embodiments, examples of which are illustrated in the accompanying drawings, wherein like reference numerals refer to like elements throughout.

FIG. 1 schematically illustrates a partial personalization of a chip card CHIPK executed in a personalization center PZ. In this example it will be assumed that the chip card CHIPK can be identified by a chip card number ID contained thereon which is unique compared to other chip cards and represented as a rectangle. The chip card number ID has preferably already been placed on the chip card CHIPK during production of the chip card CHIPK. The electronically and/or mechanically protected area of a personalization center PZ is represented by a dash-dotted line. In the process illustrated in FIG. 1, the chip card CHIPK is accessed by a chip card reader/writer CHIPLES. The link between chip card reader/writer CHIPLES and chip card CHIPK is indicated by a thick black line, likewise the connection between chip card reader/writer CHIPLES and a partial personalization module KEYGEN. The partial personalization module KEYGEN controls the chip card reader/writer CHIPLES and executes routines for partial personalization of the chip card CHIPK.

In the present example it will be assumed that the partial personalization module KEYGEN generates key information KEY1 and KEY2 as a key pair, preferably using the RSA method. In addition, the partial personalization module KEYGEN will be linked to a database CHIPDB—as indicated by a thick black line—which contains in particular a table TABKEY, with an assignment of chip card numbers, here ID, to an item of key information, in this case KEY2. Write/read accesses to data and memory by the specified components are represented by dashed arrows. In addition to the unique chip card numbers ID, the chip card CHIPK also has a memory MEM usually in the form of an EEPROM in order to enable data to be stored permanently and in an overwritable manner.

As an alternative means—not shown—of storing chip card numbers and key information in the database CHIPDB, the key information KEY1 and/or KEY2 can be derived by the partial personalization module KEYGEN by means of a suitable reconstructable method using a key known only to the personalization center PZ.

Figure 2:
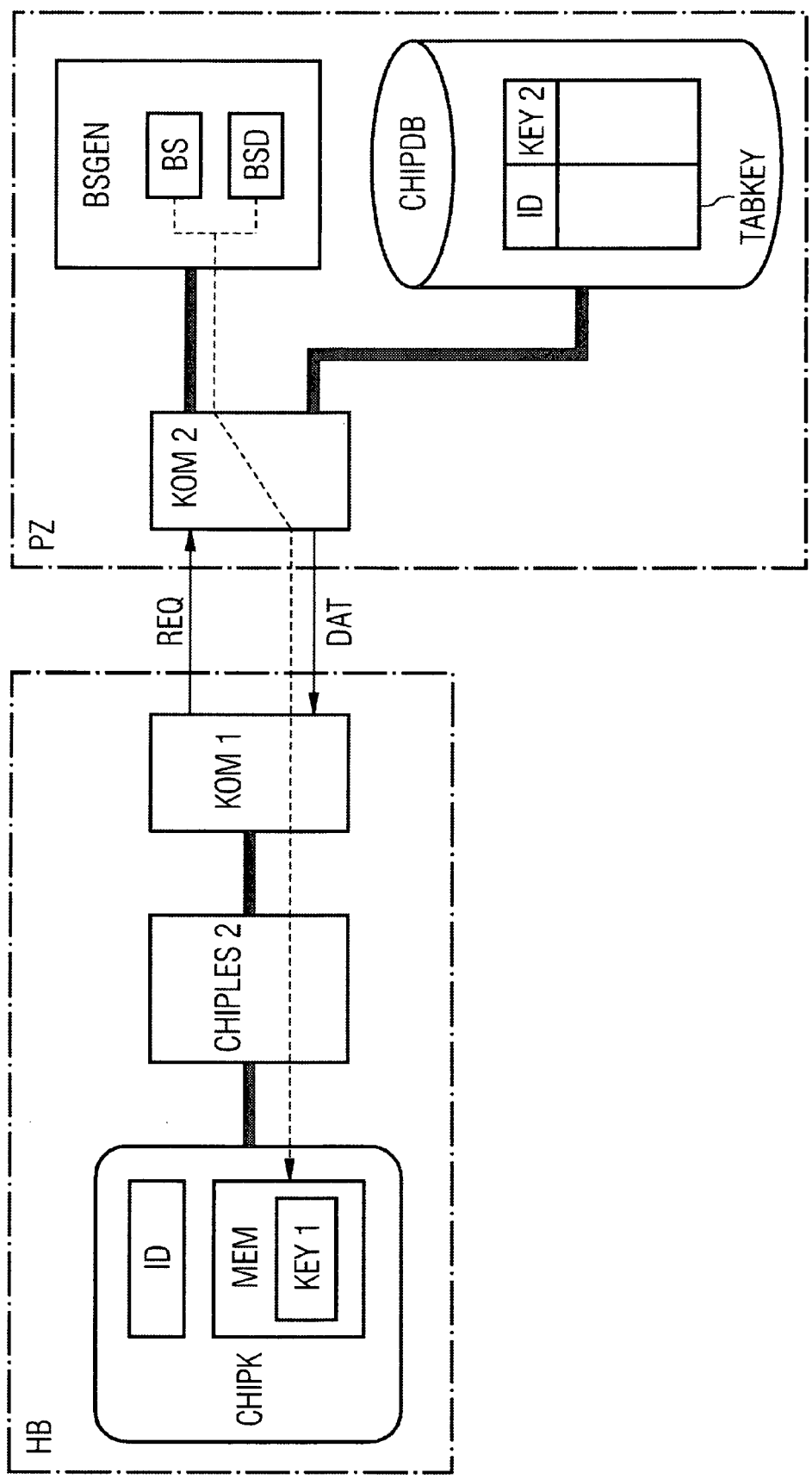
FIG. 2 is a block diagram of initiation of supplemental personalization of the chip card in a non-secure environment.

FIG. 2 schematically shows supplemental personalization being initiated by requesting an instruction sequence BS and an instruction sequence definition BSD from the personalization center PZ and its transfer to the chip card CHIPK, the chip card CHIPK being in a non-secure environment. This non-secure environment will be referred to hereinafter as the personalization location HB where supplemental personalization is to be performed. In this example it will be assumed that the personalization location HB is the domestic environment, i.e. a chip card user's home or office, other possible personalization locations HB being local personalization offices, chip cards issuing agencies such as banks and insurance companies, as well as the personalization center PZ.

The database CHIPDB and the table TABKEY in the personalization center PZ are shown in FIG. 2 in accordance with FIG. 1. The chip card CHIPK, the chip card number ID, the memory MEM, the key information KEY1, a second chip card reader/writer CHIPLES2 and the connection between the two is likewise shown analogously to FIG. 1, the chip card CHIPK and the chip card reader/writer CHIPLES2 being located not in the personalization center PZ but in a personalization location HB performing supplemental personalization. At the personalization location HB represented by a dash-dotted line there is additionally located a communications module KOM1 which controls the chip card reader/writer CHIPLES2 and can be connected via the Internet to a communications module KOM2 in the personalization center PZ, an Internet connection being just one option among many connection possibilities.

In the example it will be assumed that the communications module KOM1 establishes an Internet connection using the HTTPS protocol (HTTPS: HyperText Transport Protocol Secure), sends a request message REQ to the communications module KOM2 and the latter responds by sending back a data message DAT with the instruction sequence definition BS and associated instruction sequence definition BSD—preferably encrypted—likewise using the HTTPS protocol. For HTTPS encryption, in particular the key information KEY1 stored on the chip card CHIPK can be used and/or a public key of the personalization center PZ.

In addition to the Internet connection assumed in the example, all types of verbal, written or electronic connections are possible, e.g. radio or telephone connections. In addition, in the case of an electronic connection various communication protocols are possible, such as HTTP, HTTPS, SMTP or a proprietary protocol. The connection can also be implemented offline, i.e. without a direct electronic link, or by an online-offline combination whereby the request can be communicated to the personalization center PZ by an Internet connection and the response communicated without a direct electronic connection. In particular, it is possible in an alternative embodiment for a request to be submitted to the personalization center PZ by telephone and the requested data not to be transferred from there directly online but mailed to the user on CD-ROM, diskette, tape or other removable media and read in by the communications module KOM1.

The communications module KOM2 has access, indicated by a thick black line, to the database CHIPDB and to a generating module BSGEN for generating or determining instruction sequence BS and instruction sequence definition BSD. The transmission of the messages REQ and DAT over the Internet connection assumed in the example between the communications modules KOM1 and KOM2 is represented by arrows in each case. The transmission path of instruction sequence BS and instruction sequence definition BSD from the generating module BSGEN to the memory MEM of the chip card CHIPK is shown by a dashed arrow.

In the personalization location HB there is a user interaction terminal (not shown) on which a program is executed which performs any necessary interaction with the user. This includes e.g. consultation as to whether an Internet connection is to be set up, which instruction sequence BS is to be downloaded. In an embodiment the chip card reader/writer CHIPLES2, communications module KOM1 and the above-mentioned terminal are part of a workstation computer with standard components and standard operating system.

The communications module KOM2 can be implemented in such a way that it only accepts connection requests which satisfy a plausibility routine (not shown) contained therein. In addition, the communications module KOM2 can be connected to a Web server (not shown), can be a Web server module or can contain a Web server in order to provide options for interaction with the user of the chip card CHIPK. In particular the user can be shown a Web page with a selection list of possible chip card applications to be activated, preferably after the chip card number ID has been read and evaluated, so that only the chip card applications enabled for the chip card CHIPK are displayed.

Figure 3:
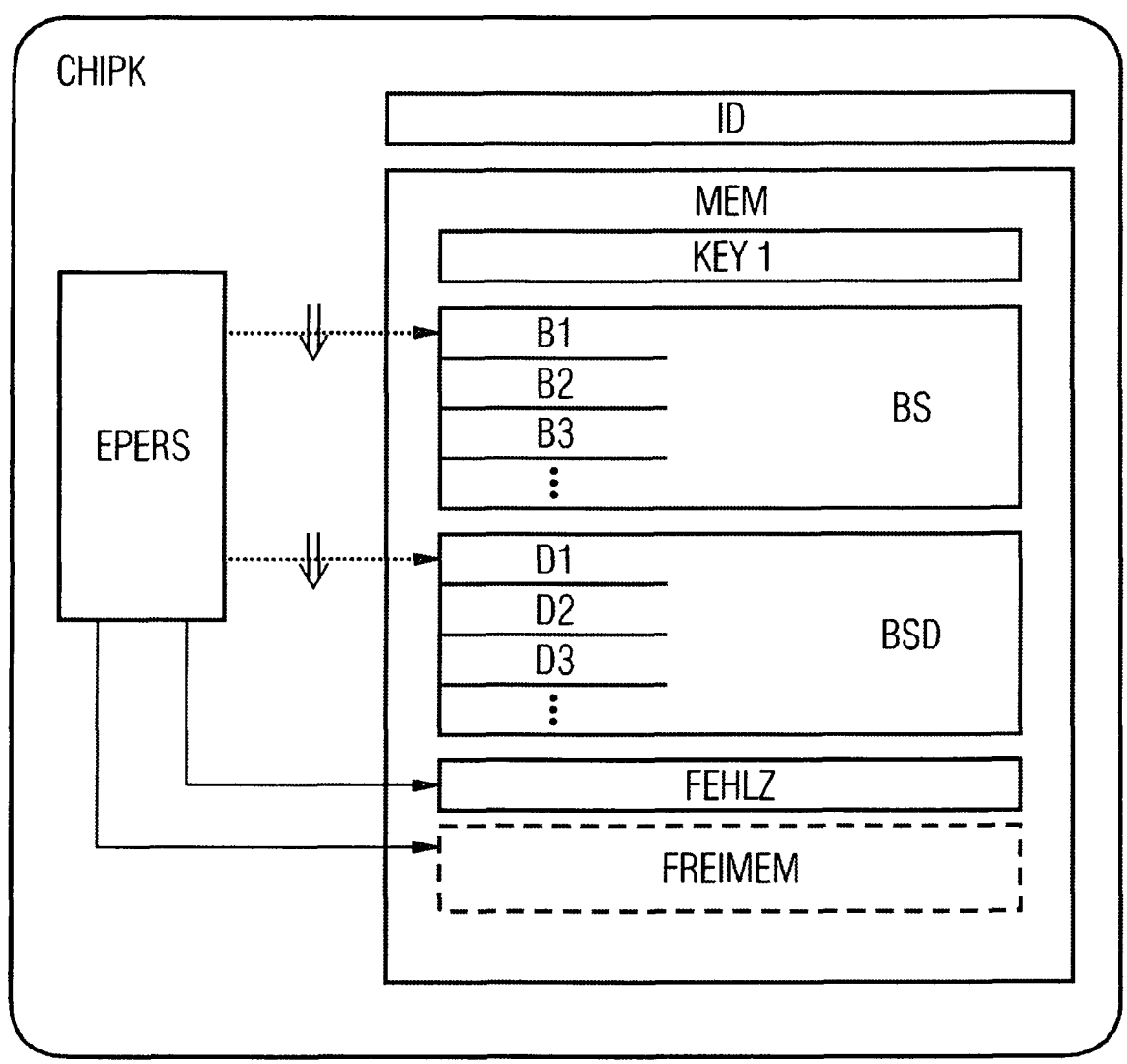
FIG. 3 is a block diagram of the chip card with loaded and permanently present modules for carrying out supplemental personalization.
Figure 4:
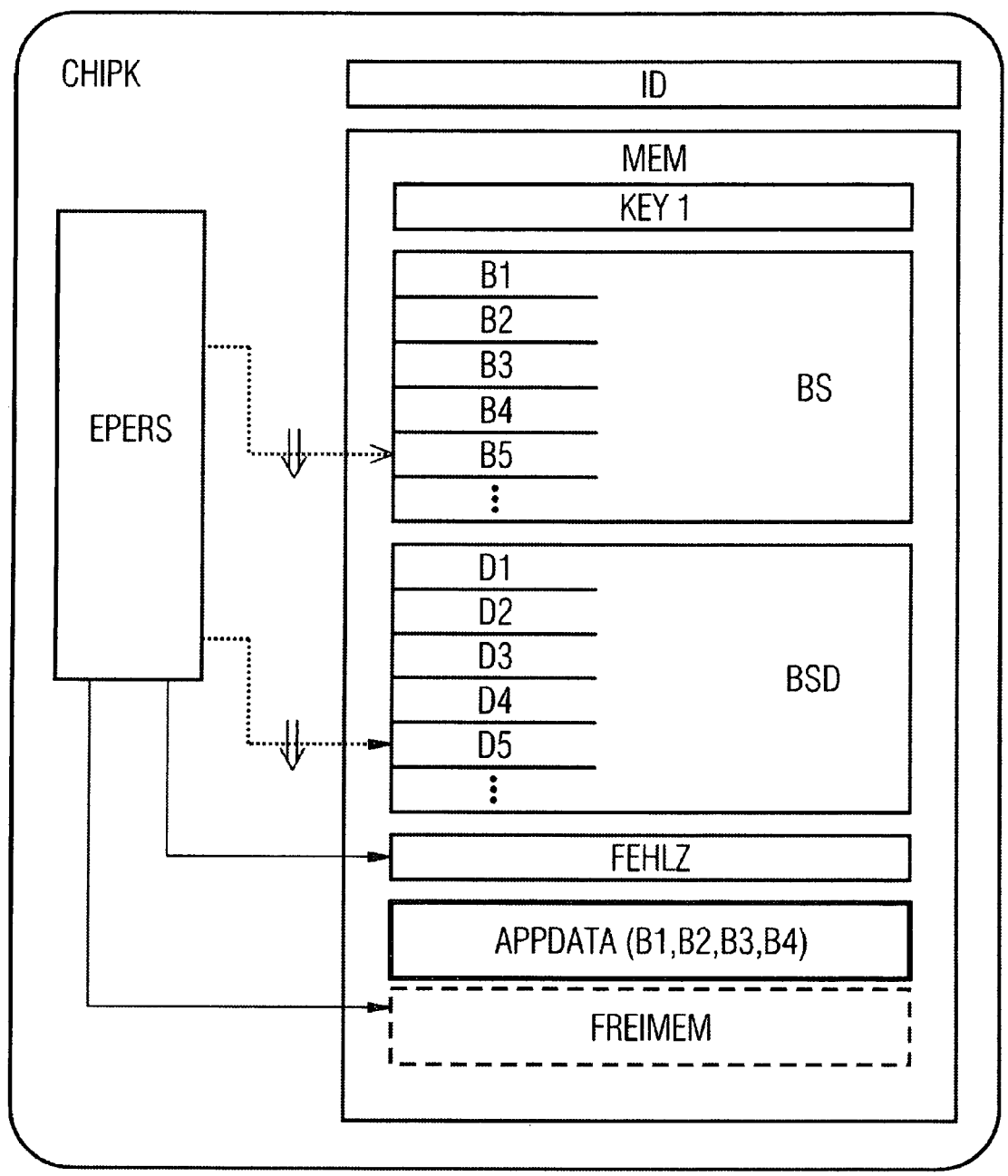
FIG. 4 is a block diagram of the chip card during processing of an instruction sequence as part of supplemental personalization and FIG. 5 is a state diagram of an instruction sequence definition as a state machine with states and state transitions.

FIGS. 3 and 4 schematically illustrate the chip card CHIPK with loaded and permanently present modules for carrying out supplemental personalization. FIG. 3 shows a state after transfer but before processing of instruction sequence BS and instruction sequence definition BSD. FIG. 4 illustrates the chip card CHIPK during processing of a 5th chip card instruction B5 of the instruction sequence BS after four chip card instructions B1, . . . , B4 have been processed. The chip card CHIPK shown in FIGS. 3 and 4 additionally has an error counter FEHLZ in the memory MEM. The error counter FEHLZ is a data field which stores the number of errors, error types and/or further details in respect of errors occurring. The memory MEM contains the key information KEY1, the instruction sequence definition BSD and the instruction sequence BS which is wherein it can be transmitted instruction by instruction to the chip card CHIPK and processed (not shown) or stored in the chip card CHIPK as a complete sequence and then processed step by step. A free memory area FREIMEM of the memory MEM is represented by a dashed rectangle. Application data APPDATA generated by the partial processing of the instruction sequence BS (from B1 to B4) is represented by a shaded rectangle inside the memory MEM. The individual instructions B1, B2, B3, B4, B5 of the instruction sequence BS are shown within this instruction sequence BS, the three dots indicating that the instruction sequence BS can contain any number of instructions. Correspondingly, the individual instruction sequence definition units D1, D2, D3, D4, D5 within the instruction sequence definition BSD are shown. The chip card CHIPK additionally incorporates a supplemental personalization routine EPERS which has read access—indicated by a dotted arrow—to the instruction sequence BS and the instruction sequence definition BSD and read and write access—indicated by a solid arrow—to the error counter FEHLZ as well as to the available free memory FREIMEM. The stepwise processing of the instructions B1, B2, B3, B4, B5 and instruction sequence definition units D1, D2, D3, D4, D5 is illustrated by a double arrow in the processing direction.

Chip card instructions B1, B2, B3, B4, B5 to be executed as part of supplemental personalization can be, in particular, instructions with write permission to a volatile or nonvolatile memory MEM of the chip card, as well as instructions which generate security certificates or key pairs.

Figure 5:
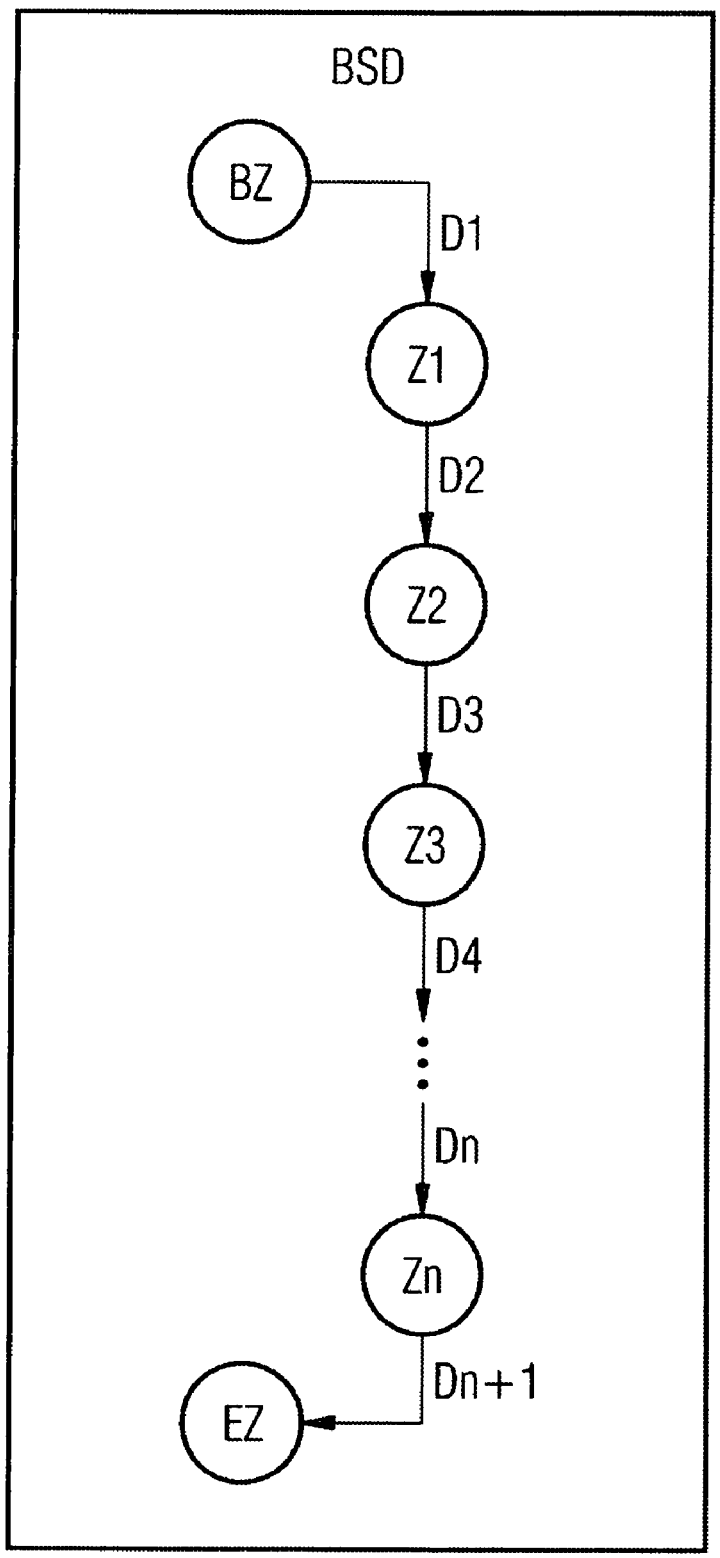

FIG. 5 illustrates an instruction sequence definition BSD which specifies state and state transitions in the manner of a state machine, its states Z1, Z2, Z3, Zn being represented as circles and the state transitions as arrows between the states Z1, Z2, Z3, Zn. The state transitions are labeled by the instruction sequence definition units D1, D2, D3, D4, Dn, Dn+1, the processing of which is effected by the state transitions. The state BZ defines the start state of the state machine; EZ defines the end state which represents successful processing of the instruction sequence BS. Usually the start and end state BZ and EZ are identical, corresponding to a neutral state of the chip card CHIPK when no supplemental personalization is taking place.

FIG. 1 illustrates partial personalization of the chip card CHIPK in the personalization center PZ. In this example the chip card CHIPK contains the unique, unmodifiable chip card number ID by which the chip card CHIPK can be identified. The partial personalization module KEYGEN requests this chip card number ID from the chip card reader/writer CHIPLES and transmits it to database CHIPDB so that an entry can be generated there in the table TABKEY. An entry for all issued chip cards is preferably stored in the table TABKEY.

The partial personalization module KEYGEN generates the preferably chip-card-individual key information KEY1 and KEY2, preferably according to the RSA scheme or using a suitable key derivation method. Depending on the method used, KEY1 and KEY2 can coincide, so that there is only one common item of key information. When using the RSA scheme, the key information KEY1 is a private key of the chip card CHIPK and key information KEY2 is an associated public key. Depending on the method used, the partial personalization module KEYGEN transfers the key information KEY2 to the database CHIPDB so that it is stored, assigned to the chip card number ID, in the table TABKEY. The partial personalization module KEYGEN transmits the key information KEY1 to the chip card reader/writer which writes the received key information KEY1 to the nonvolatile memory MEM of the chip card CHIPK where the key information KEY1 remains permanently stored. The chip card CHIPK has therefore been partially personalized with only a small number of steps and at little cost.

To activate a chip card application and/or data, such an application and/or data is set up—preferably at another personalization location and at a later time—on the partially personalized chip card CHIPK. The process required for this purpose is illustrated in FIG. 2.

In the user's home/office HB, a user inserts the chip card CHIPK issued to him into a chip card reader/writer CHIPLES2 and initiates supplemental personalization in a manner not described in further detail. The communications module KOM1 then reads the chip card number ID and transmits it, in the message REQ, to the communications module KOM2 in the personalization center PZ, preferably encrypted by the key information KEY1 and/or a public key of the personalization center PZ in order to request delivery of an instruction sequence BS and instruction sequence definition BSD. Depending on the nature of the chip card CHIPK, there can be different REQ messages for different chip card applications to be activated, or one message REQ with a parameter specifying which application is to be activated on the chip card.

The communications module KOM2 extracts, possibly after prior decryption, the transmitted chip card number ID from the message REQ and additionally determines from the message REQ which application is to be activated on the chip card CHIPK in a subsequent step. The communications module KOM2 contacts the database CHIPDB where it interrogates the key information KEY2 stored in the table TABKEY. The communications module KOM2 also requests from the generating module BSGEN an instruction sequence BS for the subsequent generation of the chip card application, and an associated appropriate instruction sequence definition BSD, the key information KEY2 possibly being provided by the communications module KOM2 and used by the generating module BSGEN for its generation. The instruction sequence definition BSD is then generated using the key information KEY2 and the instruction sequence BS in such a way that it can be used on the chip card CHIPK to check the execution of the instruction sequence BS according to various criteria.

Depending on which chip card application is to be activated, the generating module BSGEN generates or reads the application-creating instruction sequence BS and the instruction sequence definition BSD, both preferably being encrypted on a card-individual basis using the key information KEY2 and therefore only being decryptable on the chip card containing the appropriate key information KEY1. An instruction sequence BS can also be generated which, when executed, can set up a plurality of applications on the chip card CHIPK. In addition, the supplemental personalization routine EPERS can likewise be provided by the generating module BSGEN and transferred to the chip card (not shown). This is advantageous if different personalization routines are employed for different instruction sequences.

The communications module KOM2 sends the instruction sequence BS and the instruction sequence definition BSD and if necessary the supplemental personalization routine EPERS in a data message DAT, preferably encrypted using the key information KEY2 and/or verifiable using the public key of the personalization center PZ, to the communications module KOM1 in the user's home/office HB. The instruction sequence BS and the instruction sequence definition BSD are transferred to the chip card CHIPK by the communications module KOM1 writing them to the memory MEM of the chip card CHIPK using the chip card reader/writers CHIPLES2.

The communications module KOM1 also causes the supplemental personalization routine EPERS to be invoked in order to execute the instruction sequence BS as part of the supplemental personalization.

FIG. 3 schematically illustrates the chip card CHIPK after the instruction sequence BS and the instruction sequence definition BSD have been imported, after invocation of the supplemental personalization routine EPERS. If the instruction sequence BS and the instruction sequence definition BSD have been transferred to the chip card in encrypted form, they must first be decrypted by the supplemental personalization routine EPERS using the key information KEY1.

Using the key information KEY1 for decryption—preferably using standard means—therefore safeguards the subsequent checking of the instruction sequence BS using the instruction sequence definition BSD, as only instruction sequences BS prepared for decryption by the key information KEY1 can be decrypted. This implicitly prevents the execution of other instruction sequences. By protecting the entire instruction sequence BS, the relevant chip card instructions B1, B2, B3, B4, B5 of the instruction sequence BS are implicitly protected.

A pointer contained in the supplemental personalization routine EPERS points to the next instruction to be executed in the instruction sequence BS. This is initially the first instruction B1 of the instruction sequence BS. Another pointer contained therein simultaneously points to the first instruction sequence definition unit Dl to be evaluated which is assigned to the instruction B1, it being assumed in the example that the instruction sequence definition BSD includes information patterns for the entire instruction sequence BS and that there is just one instruction sequence definition unit for each instruction.

A third pointer points to the memory area in the free memory FREIMEM assigned to the application to be installed. In an alternative embodiment, this memory area can already be reserved for the application as part of partial personalization.

The representation as pointers has only been introduced for the sake of clarification and an implementation of a chip card CHIPK also without pointers is possible. The error counter FEHLZ is either already present on the chip card CHIPK or is only generated in the memory MEM by the supplemental personalization routine EPERS.

The supplemental personalization routine EPERS now reads (not shown) the first instruction B1 of the instruction sequence BS and checks by use of the associated instruction sequence definition unit D1 whether the instruction B1 satisfies this instruction sequence definition unit D1, thereby ensuring that no impermissible instruction is executed and that no instructions are executed in the wrong order. If the instruction B1 satisfies the instruction sequence definition unit D1, it is executed by the chip card CHIPK and if it is an instruction to write to the memory MEM, part of the free memory FREIMEM is written with application data APPDATA. This reduces the free memory FREIMEM. The pointers are then advanced so that the instruction B2 is set as the next instruction to be executed and the unit D2 is set as the next instruction sequence definition unit to be evaluated.

In the event of an error, the pointers are not advanced and the error counter FEHLZ is incremented. The subsequent behavior after an error can vary; for example, processing of an instruction sequence BS can be aborted or it can be attempted to re-execute the instruction. If the instruction sequence BS is aborted, the pointer can be reset to the instruction sequence definition BSD or it can remain at the same place in order to resume processing there when another instruction sequence BS has been transferred to the chip card CHIPK.

The supplemental personalization routine EPERS or an operating system routine of the chip card CHIPK can check the error counter FEHLZ and initiate an action such as rendering the chip card CHIPK unusable if a predefined threshold is exceeded.

FIG. 4 schematically illustrates the chip card CHIPK after successful processing of four instructions B1, B2, B3, B4 of the instruction sequence BS. Analogously, in the embodiment shown, after processing of the four instructions four instruction sequence definition units D1, D2, D3, D4 are also evaluated. In executing the instructions B1, B2, B3, B4, an originally free memory area has been used for storing the application data APPDATA. After processing of all the instructions of the instruction sequence BS, all the instruction sequence definition units in the instruction sequence definition BSD have been successfully evaluated in parallel and the desired application has been created in the application data APPDATA, thereby setting up the chip card application and completing supplemental personalization.

The instruction sequence BS and instruction sequence definition BSD can be deleted by the supplemental personalization routine EPERS. This routine can also terminate itself. After completion of supplemental personalization the chip card CHIPK can now use the application stored thereon.

The chip card CHIPK can send a message (not shown) concerning the successful processing of the instruction sequence BS to the communications module KOM1 which can then display this information to the user on the screen of a terminal.

The communications module KOM1 can also send a corresponding message (not shown) to the personalization center PZ.

FIG. 5 schematically illustrates an instruction sequence definition BSD simulating a state machine. Successful evaluation of an instruction sequence definition unit D1 and therefore successful processing of an instruction B1 causes the state machine to change from start state BZ to state Z1. This state is in turn left by the machine and advanced to the only following state Z2 when the instruction sequence definition unit D2 has been successfully evaluated and instruction B2 has therefore been processed. As the state machine shown in FIG. 5 possesses no kind of forward or backward loop in the state diagram, there is only one sequence of instruction sequence definition units which passes completely through the state machine and brings it to the end state EZ. The end state EZ is then, like the start state BZ, again a state which is usually assumed during normal operation of the chip card CHIPK, i.e. outside of supplemental personalization.

It can therefore be guaranteed that in an instruction sequence BS all the instructions of the instruction sequence BS are processed as specified by the instruction sequence definition BSD, that the order of the instructions satisfies the instruction sequence definition BSD and that no instructions subsequently inserted into the instruction sequence BS are processed.

By the transition from the start state BZ it can be controlled that further access rights such as write permission to particular memory areas are enabled by setting an access authorization and are available during processing of the instruction sequence BS. By the transition to the end state EZ, this access authorization can then be withdrawn again. If each chip card instruction is checked for access authorizations required from it prior to its being processed, this ensures that chip card instructions executed during supplemental personalization possess sufficient access rights, and such chip card instructions are blocked outside of supplemental personalization.

The present example encompasses authorization with the personalization center PZ, secure transmission of the instruction sequence BS, checking of the instruction sequence BS by the instruction sequence definition BSD which simulates a loopless state machine. It therefore meets the generally stringent security requirements for digital signature applications. Individually combining the specified features and individually organizing these features enables embodiments to precisely meet specific security requirements of personalization centers.

A description has been provided with particular reference to embodiments thereof and examples, but it will be understood that variations and modifications can be effected within the spirit and scope of the claims which may include the phrase "at least one of A, B and C" as an alternative expression that means one or more of A, B and C may be used, contrary to the holding in Superguide v. DIRECTV, 358 F3d 870, 69 USPQ2d 1865 (Fed. Cir. 2004).

The invention claimed is:

1. A method for personalizing a chip card, comprising:
storing key information in a memory of the chip card as part of partial personalization; and
providing supplemental personalization by:
  transferring an instruction sequence definition to the chip card,
  transferring to the chip card an instruction sequence for creating a chip card application, the instruction sequence containing chip card instructions to be executed by the chip card,
  checking at least one of the chip card instructions using the key information to ascertain in a secure fashion whether the at least one of the chip card instructions satisfies the instruction sequence definition, and
  executing the at least one of the chip card instructions by the chip card if said checking is satisfied, and
wherein the instruction sequence definition predefines states and state transitions of a state machine which changes from a particular state to a predefined subsequent state different from previously assumed states, the particular state having assigned thereto a predefined chip card instruction permitted for execution in the particular state.

2. The method as claimed in claim 1, further comprising:
storing an access authorization on the chip card when execution of the instruction sequence is permitted;
checking for the access authorization prior to execution of a particular one of the chip card instructions; and
executing the particular one of the chip card instructions only if the access authorization is present.

3. The method as claimed in claim 2, wherein the key information is unique for the chip card or a chip card group including the chip card.

4. The method as claimed in claim 3, wherein the supplemental personalization further comprises transferring to the chip card a supplemental personalization routine performing the supplemental personalization.

5. The method as claimed in claim 1, wherein the instruction sequence definition, the instruction sequence, the supplemental personalization, a chip card application partially created by processing the instruction sequence up to a particular chip card instruction, an access authorization, the state machine and/or a particular state assumed by the state machine are stored in a preferably nonvolatile memory of the chip card.

6. The method as claimed in claim 5, after complete processing of the instruction sequence, executing operations, comprising:

storing information indicating completed supplemental personalization on the chip card;

and at least one of:

deleting the access authorization from the chip card; and deleting from the chip card at least one of the instruction sequence definition, the instruction sequence, the supplemental personalization, the state machine and a state of the state machine.

7. The method as claimed in claim 6, wherein a sequencing chip card instruction included in the instruction sequence contains another instruction sequence definition for a another instruction sequence.

8. The method as claimed in claim 7, further comprising:

invoking, after execution of a last chip card instruction of the instruction sequence, a test routine for checking successful personalization; and if defective personalization is detected, storing information indicating the defective personalization onto the chip card by the test routine.

9. The method as claimed in claim 8, further comprising, as part of the partial personalization, executing a reservation routine reserving a memory area on the chip card accommodating chip card application data generated during execution of the instruction sequence for the supplemental personalization.

10. The method as claimed in claim 9, further comprising blocking invocation of any chip card instructions not contained in the instruction sequence, until the instruction sequence has been completely processed.

* * * * *